2,757,212

PROCESS OF REACTING A HALOGEN, FLUORINE COMPOUND AND CARBON AT TEMPERATURES ABOVE 1500° C.

Charles S. Cleaver, McDaniel Crest, and Mark W. Farlow, Holly Oak, Del., assignors to E. I. du Pont de Nemours and Company, Wilmington, Del., a corporation of Delaware No Drawing. Application March 25, 1955, Serial No. 496,938

8 Claims. (Cl. 260—653)

This invention relates to a new process of preparing halogenated hydrocarbons. More particularly, it relates to a process of preparing compounds containing only carbon, fluorine and another halogen, the latter being chlorine or bromine. For the sake of brevity these compounds will be hereinafter called halofluorocarbons.

The halofluorocarbons are extremely valuable compounds. For example, the chlorofluorocarbons find extensive use as refrigerant materials and as ingredients of insecticidal compositions, e. g., as propellants. The bromofluorocarbons are used as fire-extinguishing liquids.

This invention has as an object a new process for the preparation of aerosol propellants. A further object is the preparation of fire extinguishing liquids. Other objects will appear hereinafter.

These objects are accomplished by the present invention of the process wherein a halogen of atomic number 17 to 35, inclusive, i. e., chlorine or bromine, is reacted at a temperature of at least 1500° C. with carbon and carbon tetrafluoride or carbonyl fluoride.

The organic fluorine compounds suitable for use in the process of this invention, viz., carbon tetrafluoride and carbonyl fluoride, are available at reasonable costs. Carbon tetrafluoride can be produced by electrolysis, using carbon electrodes, of hydrogen fluoride or of certain metallic fluorides. Carbonyl fluoride can be made by reacting phosgene with antimony trifluoride. An improved method consists in reacting phosgene with hydrogen fluoride and separating the carbonyl fluoride from the hydrogen chloride formed by treating the reaction products with an agent, such as an alkali metal fluoride, sulfur trioxide or phosphorus pentoxide, which absorbs the hydrogen chloride without reacting with the carbonyl fluoride. This latter method is disclosed and claimed in application Ser. No. 489,294, filed February 18, 1955, by C. W. Tullock.

The process of this invention can be carried out in various ways. For example, a mixture of the vaporized organic fluoride with the chosen halogen (chlorine or bromine) can be passed, if desired with an inert carrier gas such as nitrogen, argon or helium, through a column of carbon heated at a temperature of at least 1500° C. in a tubular reactor. The reactor must be fabricated of a material resistant to the corrosive effect of free halogens at the reaction temperature. The most suitable construction material is graphite. Reactors made of alumina or refractory ceramic are also suitable. The reactor is placed inside a resistance-heated furnace or an induction-heated furnace. Temperatures in the range of 1500° C. to about 2500° C. are obtainable in this method. A preferred mode of operation consists in bringing the vaporized reactants, that is, chlorine or bromine and the organic fluoride, in contact with the carbon electrodes of a carbon arc, where the temperature is estimated to be in the range of from about 2500° C. to about 3500–4000° C. or even higher. In this mode of operation, the two vaporized reactants can be mixed before entering the arc zone, or the organic fluoride can be passed through the arc and the chlorine or bromine injected in the off-gas beyond the arc, but at a point where the reactive intermediates are still present, such a point being within a zone of temperature exceeding about 1500° C. The distance beyond the arc at which such conditions still obtain depends partly on the shape of the arc and of the apparatus, and partly on such factors as pressure and rate of throughput. Under the conditions used in the examples below, the point of injection of the halogen should be not more than 4 inches, preferably not more than 2 inches, beyond the arc. Both of the above procedures are illustrated in the examples below.

Whatever method is used, the reaction product is preferably cooled as quickly as possible following contact with the carbon in order to avoid side reactions such as decomposition or polymerization. In practice, it is desirable to quench the reaction product by bringing it to a temperature not exceeding about 400° C. within one second, and preferably within from 0.001 to 0.1 second, following reaction with the carbon.

The relative ratios of the reactants are not critical. In general, it is preferred to use between about 0.25 and about 2.5 gram atoms of chlorine or bromine per gram atom of combined fluorine. The carbon is normally used in amount at least sufficient to combine with all the fluorine present, and preferably in excess thereover.

Contact time between the reactants is not critical. It can be extremely short, e. g., between about 0.001 and 0.1 second, as is normally the case when operating in a carbon arc; or it can range upwards to about 30 seconds or even more, particularly when the vaporized reactants are passed through a column of heated carbon.

Any form of carbon, whether amorphous or crystalline, is suitable for the purpose of this invention. Thus, there can be used coal, graphite, charcoal, the various forms of carbon black such as lamp black, acetylene black, bone black, channel black, etc. In general, higher conversions are obtained with active carbon, of which many well-known varieties are available commercially. Active carbon is very finely divided, porous carbon having a total surface area of at least 20 square meters per gram (Hassler, "Active Carbon," Chemical Publishing Company, 1951, p. 127). When using the carbon arc, the activity or state of subdivision of the carbon is apparently of no consequence, but the carbon must, of course, possess sufficient conductivity. The carbon need not be rigorously pure and it may, for example, contain the normal amount of ash, e. g., from 0.5 to 4% by weight in the case of most active carbons.

The reactants should preferably be substantially anhydrous. It is often desirable to dehydrate the carbon prior to reaction since carbon, especially of the active or absorbent variety, can retain significant amounts of water even at high temperatures.

The absolute pressure in the reaction zone is not critical. In general, low pressures of the order of 1 to 100 mm. of mercury are preferred when operating with the carbon arc, since the operation of the arc becomes more difficult with higher pressures. Atmospheric or somewhat higher or lower pressures can be used when operating with more conventional reactors such as a heated tube.

When using the carbon arc, the arc can be operated at low or high voltage and with either direct or alternating current. Good results are obtained when the reaction is carried out in electric arcs produced between carbon electrodes with a current of 10 to 50 volts and of 10 to 30 amperes, although arc operation is by no means limited to this range of voltage and amperage. Forms of carbon arcs suitable for the purpose of this invention are illustrated in detail in application Ser. No. 409,484, filed by M. W. Farlow and E. L. Muetterties on February 10, 1954, and allowed on October 27, 1954

(now Patent No. 2,709,186). The arcs described therein can be readily modified to permit injection of the chlorine or bromine either before or immediately after the arc zone, if it is desired to operate in this manner rather than to premix the volatile reactants.

The reaction normally gives a mixture of halofluorocarbons, which are chiefly or almost exclusively the chlorofluoromethanes or bromofluoromethanes, with some dichlorotetrafluoroethane and small amounts of other halofluorocarbons. When carbonyl fluoride is used, the reaction product also contains carbon oxides, and some carbon tetrafluoride.

The various reaction products are in general separable without difficulty by fractionation, for example in a high pressure, low temperature still. If desired, some preliminary separation can be effected, for example by first condensing out the unreacted chlorine or bromine by passing the gaseous reaction product through traps maintained at a suitable temperature. Another preliminary purification can be effected by treating the crude reaction product with alkaline absorbents to remove the unchanged halogen, the carbon dioxide, if any is present, or the unchanged carbonyl fluoride if the latter is used. The free halogen can also be removed by treatment with a Group II metal, such as mercury.

The following examples, in which parts are by weight, illustrate the invention.

*Example I*

Carbon tetrafluoride was reacted with chlorine and the carbon electrodes of a carbon arc as follows. The anode was a hollow graphite cylinder mounted at the end of a copper tube. Inside the copper tube, and projecting inside the hollow graphite anode, was a quartz tube through which gaseous chlorine or bromine could be injected. The copper tube has a side outlet through which the gaseous reaction products escaped, and from which they passed immediately into a trap cooled in liquid nitrogen. The cathode was a solid graphite cylinder mounted on a copper tube having perforations on the end holding the cathode. The cathode was placed with its end nearly flush with the open end of the hollow anode. Both copper electrode holders were water-cooled. The electrodes were mounted in a water-cooled, gas-tight glass jacket which was evacuated to a pressure of a few tenths of a millimeter of mercury. In the operation of this type of arc, the incoming gas, or mixture of gases, enters through the perforations in the copper tube around the carbon cathode and exists through the hollow anode after having passed through the burning arc. If the volatile reactants are not premixed, the chlorine or bromine is injected into the off-gas immediately (within a temperature zone exceeding about 1500° C.) after it has passed through the arc. The gaseous reaction product then passes through the hollow anode and out through the copper tube holding the anode into the cold trap, where it is condensed.

In this example, carbon tetrafluoride (11.6 parts) was passed through the carbon arc over a period of 15 minutes and chlorine (12 parts) was injected into the off-gas at a point two inches from the arc during the same period. The arc was operated with a direct current of 20–21 volts and 25–27 amperes. The pressure inside the jacket surrounding the arc was 55 mm. There was obtained 23 parts of condensate from the gaseous reaction product. Infrared analysis of the gaseous products showed that it contained carbon tetrafluoride, dichlorodifluoromethane, chlorotrifluoromethane, hexafluoroethane, and 1,2-dichlorotetrafluoroethane, in the approximate molar ratios of 25:5:1:1.5:2, and trace amounts of carbonyl fluoride and octafluoropropane. The remainder was chiefly chlorine.

*Example II*

Using the carbon arc described in Example I, except that the gas injector tube inside the hollow anode was dispensed with, other operating conditions being substantially identical, a preformed mixture of 8 parts of carbon tetrafluoride and 15 parts of chlorine was passed through the arc over a period of 12 minutes. There was obtained 23 parts of condensed reaction product which was found by infrared analysis to contain carbon tetrafluoride, chlorotrifluoromethane, and dichlorodifluoromethane in the approximate molar ratios of 55:5:1, and traces of trichlorofluoromethane and carbonyl fluoride. The remainder was chiefly chlorine.

*Example III*

Using the apparatus and following the procedure of Example I, 5.5 parts of carbon tetrafluoride was passed through the arc during 16 minutes, while at the same time 4.4 parts of chlorine was injected into the off-gas stream at a point one inch from the arc. The arc was operated at 22–26 volts and 19–20 amperes D. C. The operating pressure in the arc varied from 18–24 mm. There was obtained 9.9 g. of reaction product, which was shown by infrared analysis to contain carbon tetrafluoride, chlorotrifluoromethane, dichlorodifluoromethane, 1,2-dichlorotetrafluoroethane and hexafluoroethane in the approximate molar ratios of 11:1:3:2:1, and a trace of octafluoropropane.

*Example IV*

Carbon tetrafluoride (3.7 parts) was passed through the carbon arc of Example I over a period of 11 minutes, and 6.3 parts of vaporized bromine was injected in the off-gas stream at a point one inch from the arc during the same time. The arc was operated at 20–26 volts and 14–19 amperes D. C. The operating pressure in the arc varied from 32 to 35 mm. The reaction product (10 parts) contained carbon tetrafluoride, bromotrifluoromethane, dibromodifluoromethane, tetrafluoroethylene, and hexafluoroethane in the approximate molar ratios of 45:1:10:1:1.5, and a trace of hexafluoropropane.

*Example V*

Carbonyl fluoride and bromine were reacted with the carbon electrodes of a carbon arc essentially similar to that described in Example I except that the hollow graphite anode was not provided with an inlet tube for the halogen. The volatile reactants (carbonyl fluoride and bromine) were introduced through separate inlets into the copper tube holding the cathode, where they mixed prior to passing through the arc. The arc was operated at 19 volts and 20–21 amperes D. C. The inlet pressure of carbonyl fluoride was 8 mm. and that of bromine was 16 mm. The outlet pressure from the arc was less than 1 mm. During a period of 10 minutes, there was passed through the arc 5.4 parts of carbonyl fluoride and about 20 parts of bromine. In a first trap, cooled in a carbon dioxide/acetone mixture, there was obtained 4.4 parts of condensate which was treated with mercury to remove bromine. This left 2.3 parts of volatile material which infrared analysis showed to contain mainly 1,2-dibromotetrafluoroethane, with small amounts of silicon tetrafluoride presumably formed through adventitious hydrolysis of carbonyl fluoride and reaction of the resulting hydrogen fluoride with the glass cell of the analytical apparatus. The material condensed in a second trap, cooled in liquid nitrogen, was similarly treated with mercury. The residue (5 parts) contained, as shown by infrared analysis, tetrafluoroethylene, carbon tetrafluoride, bromotrifluoromethane, dibromodifluoromethane and 1,2-dibromotetrafluoroethane in the approximate molar ratios of 2:1:2:3:1, and a trace of hexafluoroethane.

This invention affords a convenient and relatively economical method of preparing the technically highly valuable chlorofluoromethanes and bromofluoromethanes.

The above examples are merely illustrative and minor variations in the procedure will suggest themselves. For example, it will be seen that the process can be made continuous or semi-continuous by fractionating the reaction product and recirculating the unreacted starting materials.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. Process of preparing compounds containing only carbon, fluorine, and a halogen of atomic number 17 to 35, inclusive, which comprises reacting said halogen in the elementary state at a temperature of at least 1500° C. with carbon and an organic fluorine compound of the class consisting of carbon tetrafluoride and carbonyl fluoride.

2. Process of preparing compounds containing only carbon, fluorine, and chlorine which comprises reacting elementary chlorine at a temperature of at least 1500° C. with carbon and an organic fluorine compound of the class consisting of carbon tetrafluoride and carbonyl fluoride.

3. Process of preparing compounds containing only carbon, fluorine, and chlorine which comprises reacting elementary chlorine at a temperature of at least 1500° C. with carbon and carbon tetrafluoride.

4. Process of preparing compounds containing only carbon, fluorine, and bromine which comprises reacting elementary bromine at a temperature of at least 1500° C. with carbon and an organic fluorine compound of the class consisting of carbon tetrafluoride and carbonyl fluoride.

5. Process of preparing compounds containing only carbon, fluorine, and bromine which comprises reacting elementary bromine at a temperature of at least 1500° C. with carbon and carbon tetrafluoride.

6. Process of preparing compounds containing only carbon, fluorine, and bromine which comprises reacting elementary bromine at a temperature of at least 1500° C. with carbon and carbonyl fluoride.

7. Process of any of claims 1 to 6 wherein the halogen and the fluoride are reacted with the carbon of a carbon arc.

8. Process of any of claims 1 to 7 wherein the reaction products are cooled below 400° C. within one second, and preferably within from 0.001 to 0.01 second, following reaction with the carbon.

No references cited.